US011157974B2

(12) United States Patent
Nguyen

(10) Patent No.: US 11,157,974 B2
(45) Date of Patent: Oct. 26, 2021

(54) PREPAID UTILITY METERING WITH COMPLEX RATES USING ADVANCED METERING INFRASTRUCTURE (AMI) SMART METERS

(71) Applicant: ORACLE INTERNATIONAL CORPORATION, Redwood Shores, CA (US)

(72) Inventor: Hung Nguyen, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 647 days.

(21) Appl. No.: 15/478,462

(22) Filed: Apr. 4, 2017

(65) Prior Publication Data

US 2018/0108057 A1 Apr. 19, 2018

Related U.S. Application Data

(60) Provisional application No. 62/408,321, filed on Oct. 14, 2016.

(51) Int. Cl.
*G06Q 30/04* (2012.01)
*G06Q 50/06* (2012.01)
(Continued)

(52) U.S. Cl.
CPC .......... *G06Q 30/04* (2013.01); *G06Q 20/102* (2013.01); *G06Q 20/145* (2013.01);
(Continued)

(58) Field of Classification Search
CPC .......... G06F 19/00; G06F 1/163; G06F 3/017; G06F 21/32; G06F 19/3481;
(Continued)

(56) References Cited

U.S. PATENT DOCUMENTS

2001/0051933 A1* 12/2001 Rowley .................. G01D 4/004
705/412
2003/0009401 A1* 1/2003 Ellis ....................... G06Q 30/04
705/35
(Continued)

OTHER PUBLICATIONS

Oracle furthers innovation for utilities industry; electric, gas and water utilities worldwide improve customer service with oracle utilities solutions. (Apr. 29, 2013). M2 Presswire Retrieved from https://dialog.proquest.com/professional/docview/1346760317?accountid=131444 (Year: 2013).*
(Continued)

*Primary Examiner* — Michael P Harrington
(74) *Attorney, Agent, or Firm* — Kraguljac Law Group, LLC

(57) ABSTRACT

Systems, methods, and other embodiments associated with performing multiple periodic meter data evaluations during a billing cycle are described. In one embodiment, a method includes performing a plurality of meter data evaluations at periodic intervals during a billing cycle for consumption of a resource by a user having a prepaid account for the resource. The example method may also include for a meter data evaluation, obtain meter data from a meter. The meter data is indicative of a consumption measurement during a first timespan. The example method may also include executing a charge calculation function upon the consumption measurement to generate a charge amount for the first timespan. The charge amount is deducted from a credit balance within the prepaid account to create a first temporary billing segment indicative of a current balance of the prepaid account. A shutoff command is created if the current balance is below a threshold.

17 Claims, 9 Drawing Sheets

(51) Int. Cl.
*G06Q 20/14* (2012.01)
*G06Q 30/02* (2012.01)
*G06Q 20/10* (2012.01)

(52) U.S. Cl.
CPC ......... *G06Q 30/0207* (2013.01); *G06Q 50/06* (2013.01); *Y04S 50/12* (2013.01); *Y04S 50/14* (2013.01)

(58) Field of Classification Search
CPC .. G06F 3/0488; G06F 19/3418; G06F 3/0482; G06F 21/6245; G06F 3/04883; G06F 16/951; G06F 19/3475; G06F 1/1632; G06F 21/6254; G06F 3/01; G06F 3/012; G06F 3/015; G06F 3/0346; G06F 3/048; G06F 3/04817; G06F 3/0485; G06F 3/1454; G06F 8/65; G06F 11/1451; G06F 11/1453; G06F 16/1748; G06F 16/183; G06F 16/215; G06F 16/2455; G06F 16/24575; G06F 16/25; G06F 16/252; G06F 16/275; G06F 16/3344; G06F 16/583; G06F 19/321; G06F 19/328; G06F 1/1626; G06F 1/1652; G06F 1/1686; G06F 1/1698; G06F 1/3265; G06F 21/00; G06F 21/31; G06F 21/34; G06F 21/36; G06F 21/44; G06F 21/6218; G06F 21/6227; G06F 21/6263; G06F 2203/04105; G06F 2203/04803; G06F 2221/2111; G06F 2221/2153; G06F 3/011; G06F 3/013; G06F 3/016; G06F 3/0304; G06F 3/0414; G06F 3/0481; G06F 3/04842; G06F 3/04845; G06F 3/04886; G06F 3/0622; G06F 3/0637; G06F 3/0673; G06F 8/60; G06F 8/61; G06F 9/451; G06Q 30/02; G06Q 30/0283; G06Q 50/06; G05B 15/02; G05B 19/042; Y02B 20/46; Y04S 20/30; Y04S 20/12

See application file for complete search history.

(56) References Cited

U.S. PATENT DOCUMENTS

| | | | | |
|---|---|---|---|---|
| 2003/0069840 A1* | 4/2003 | Ung | .................. | G06Q 20/10 705/39 |
| 2006/0031180 A1* | 2/2006 | Tamarkin | .............. | G01D 4/004 705/412 |
| 2008/0154624 A1* | 6/2008 | O'Neil | .................. | G01D 4/002 705/34 |
| 2009/0186598 A1* | 7/2009 | Cipoletti | ............. | H04L 12/1467 455/406 |
| 2011/0285546 A1* | 11/2011 | Vadali | ................... | G01D 4/002 340/870.16 |
| 2014/0081998 A1* | 3/2014 | Fan | ........................ | G06F 16/29 707/754 |

OTHER PUBLICATIONS

BTC to provide prepaid electricity. (Apr. 13, 2016). Internet Wire Retrieved from https://dialog.proquest.com/professional/docview/1780916400?accountid=131444 (Year: 2016).*

* cited by examiner

PREPAID UTILITY METERING WITH COMPLEX RATES USING ADVANCED METERING INFRASTRUCTURE (AMI) SMART METERS

CROSS REFERENCE TO RELATED APPLICATIONS

This disclosure claims the benefit of U.S. Provisional Patent Application Ser. No. 62/408,321 filed Oct. 14, 2016, titled "Prepaid Utility Metering With Complex Rates Using Advanced Metering Infrastructure (AMI) Smart Meters", which is incorporated herein by reference in its entirety.

BACKGROUND

Many users consume resources from a resource provider, such as gas, electric, water, internet, cellular usage, etc. For example, a homeowner can establish an account with a gas company that has installed a gas meter within a home of the homeowner. As the homeowner consumes gas, the gas meter tracks the consumption. After a billing cycle, the gas company retrieves data from the gas meter regarding a total consumption for the billing cycle. Consumption may be obtained throughout the billing cycle, such as in more granular intervals of time than the billing cycle. For example, utilities typically obtain consumption for each 15 minute interval once per day. In an example, the gas meter is capable of communicating with a computing device of the gas company, such as two way communication. Thus, the gas meter can send consumption data and other data to the gas company and receive data and commands from the gas company such as a shutoff or turn on command. The gas company creates a bill that is sent to the homeowner for payment.

Some users can establish a prepaid account with a resource provider. For example, the homeowner can establish a prepaid account with an electricity company that has installed an electric meter within the home of the homeowner: The homeowner deposits a credit into the prepaid account, such as through the use of a payment, etc. As electricity is used by the user, the credit is consumed from the prepaid account. Once the prepaid account is depleted, then access to the electricity resource should be stopped. Unfortunately, rate charge calculations (e.g., calculation of charges) can be complex for certain situations and users, such as where a user gets a subsidy, has an age discount, pays an increased rate during surges, has seasonal rates, is charged a fixed charge such as for infrastructure costs, etc. These types of rate charges can be too complex for meters to perform real-time during the billing cycle, and thus they are only calculated at the end of billing cycles. One issue with complex rates is that the charges may not be a linear function of consumption, such as where the first 20 kWh may cost 20 cents per kWh whereas the next 20 kWh may cost 7 cents per kWh, and so on. Such charges per kWh cannot be pre-determined up front. Thus, when a billing cycle ends, the user may have consumed more resources than allowed, such as where the meter did not take into account a fixed infrastructure charge when deducting credits during the billing cycle for consumption. According, the user will owe the resource provider additional credits. This inaccuracy results in a true-up process where the user and the resource provide must make adjustments such as crediting or debiting the user after the billing cycle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
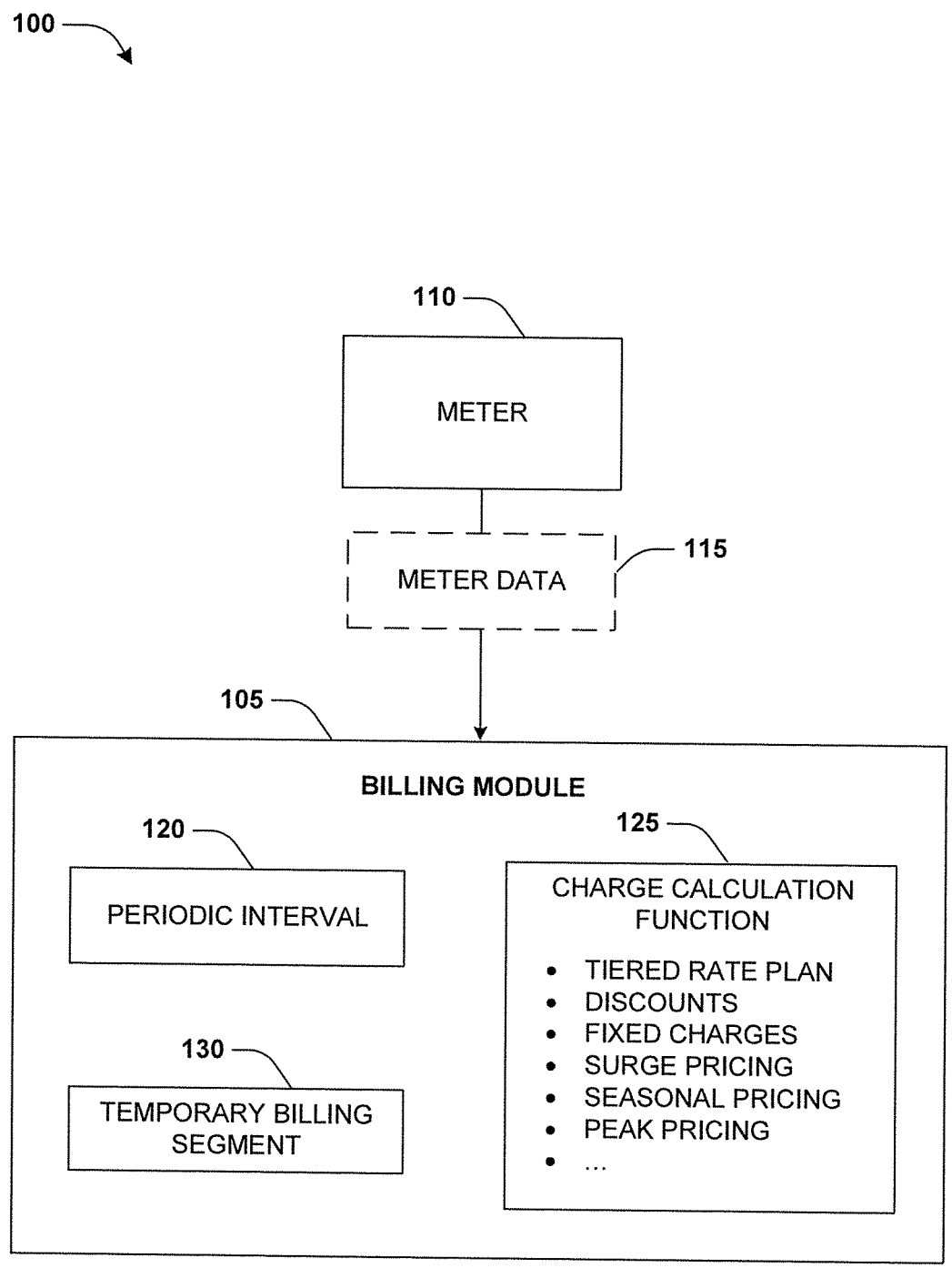
FIG. 1 illustrates an embodiment of a system associated with performing multiple periodic meter data evaluations during a billing cycle.

Computerized systems and methods are described herein that provide for performing multiple periodic meter data evaluations during a billing cycle. A user can establish a prepaid account for a resource, such as gas. The user can credit the prepaid account with a certain credit balance of credits. As the resource is consumed, the credits can be deducted from the prepaid account. As provided herein, periodic meter data evaluations are performed at periodic intervals during a billing cycle between the generation of two bills, such as every 15 minutes or any other time period. During a meter data evaluation, complex charge calculation functions can be executed upon consumption measurements from a meter associated with the prepaid account. The complex charge calculation functions can take into account fixed charges, discounts, subsidies, seasonal rates, surge rates, peak usage rates, etc.

The meter data evaluation creates a temporary billing segment that is indicative of a current balance of the prepaid account from a start of a current billing cycle to an instance of a periodic interval occurring that triggers the meter data evaluation. In one embodiment, the temporary billing segment is a record of charges that captures true charges if the user stops consuming any resource at a particular point in time (e.g., actual charges from a start of the current billing cycle up to a point in time at which the temporary billing segment is created). Thus, the temporary billing segment is a temporary balance calculation. The current balance is determined by deducting a charge amount, determined by a charge calculation function, from the credit balance. Various actions can be performed based upon the current balance, such as sending a shutoff command to the meter to shutoff access to the resource before the billing cycle ends due to the credit balance being below a threshold such as a zero balance. These actions can be performed at each periodic interval, such as where a determination is made as to whether the meter should shut off access to the resource every 15 minutes. In this way, when a billing cycle ends, there is a reduced chance that the user will owe additional credits, otherwise due to consuming the resource beyond the current balance, because any differences are minimized because a true-up is effectively performed at each interval. The chance of having to perform a true up is reduced because the current balance is calculated at a much greater frequency than at the end of each billing cycle and at a higher accuracy using the complex charge calculation functions during the billing cycle.

Temporary billing segments are stored in temporary data structures that do not trigger performance of a full ledger transaction. Instead, a temporary billing segment may be retained for a threshold amount of time, until a next (N) temporary billing segments are created, or any other trigger for deleting or replacing the temporary billing segment. The temporary nature of the temporary billing segment drastically reduces storage resource utilization that would otherwise have to store billing segments that are created for thousands of customers every periodic interval such as every 10 minutes. The temporary billing segment does not trigger a full ledger transaction that would otherwise involve computing billing data, deducting credits, performing accounting, and executing various software functionality to perform such. Thus, substantial processing resources are also saved.

With reference to FIG. 1, one embodiment of a computer system 100 associated with performing multiple periodic meter data evaluations during a billing cycle is illustrated. The system 100 includes a billing module 105, which can be configured to execute on a computer, such as computer 515 of FIG. 5. In one embodiment, the billing module 105 is implemented on a computer device external to a meter 110 used to track consumption of a resource. The billing module 105 can communicate with the meter 110 over a communication network. In other embodiments, the billing module 105 is implemented within the meter 110, such as within circuity of the meter 110. The billing module 105 can communicate with another computer such as a computer of a resource provider over the communication network.

The billing module 105 is configured to execute a plurality of meter data evaluations at periodic intervals 120 during a billing cycle for consumption of the resource by a user having a prepaid account for the resource. In one embodiment, the billing cycle is between when a first bill and a second bill are generated. In one embodiment, the billing module 105 defines the periodic interval 120 as every 20 minutes. Thus, for a 30 day billing cycle, meter data evaluations will be triggered every 20 minutes in order to determine whether any actions should be performed before the end of the 30 day billing cycle. Such actions can be performed to shut off access to the resource, notify the customer of a low credit balance, restore access to the resource, etc. without performing a full ledger transaction/accounting. When an instance of the periodic interval 120 occurs, a meter data evaluation is triggered.

During the meter data evaluation, meter data 115 is obtained from the meter 110. In one embodiment, the meter data 115 is pulled by the billing module 105 from the meter 110 over the communication network. In another embodiment, the meter data 115 is pushed from the meter 110 to the billing module 105 over the communication network. The meter data 115 is indicative of a consumption measurement of the resource during a timespan from a start of the billing cycle (e.g., when a last bill was generated) and when the instance of the periodic interval 120 occurred to trigger the meter data evaluation. In one embodiment, acquired meter data is retained so that subsequent acquisitions of meter data obtains merely consumption data from the last time meter data was acquired.

The billing module 105 executes a charge calculation function 125 upon the consumption measurement to generate a charge amount for the timespan from when the billing cycle started to when the periodic interval 120 occurred to trigger the meter data evaluation. The charge calculation function 125 can take into account various complexities and considerations for generating the charge amount. In one embodiment, the charge calculation function 125 takes into account a tiered rate plan where a first level of consumption is charged at a first rate, a second level of consumption is charged at a second rate, etc. (e.g., a first 10 kW used during a billing cycle is charged at a lower rate than the next 10 kW). The tiers may be defined based upon levels of consumption or other factors such as temporal factors or any other criteria. Thus, the first rate may be applied to a first portion of the consumption measurement, the second rate may be applied to a second portion of the consumption measurement (e.g., if more than 10 kW have already been used), etc.

In another embodiment, the charge calculation function 125 can take into account various discounts. A discount can relate to an age of the user, which can be determined based upon user data of the user (e.g. user account data). The discount can take into account a user characteristic of the user such as a subsidy for users below a certain income threshold or living in a certain region, which can be determined based upon the user data of the user. The discount can correspond to a variety of different factors, such as a coupon, a temporary promotional rate, a certain usage level, a negotiated discount, etc.

In another embodiment, the charge calculation function 125 can take into account a fixed charge. The fixed charge could relate to a recurring infrastructure charge, a onetime repair charge, or any other type of charge. In another embodiment, the charge calculation function 125 can take into account a surge of consumption exceeding a threshold. For example, a user may suddenly utilize a much larger amount of the resource than usual/expected for a few hours, which can put strain on infrastructure of the resource provider. Such surge of consumption may be charged at a higher rate. Accordingly, the meter data 115 is evaluated to detect any surges of consumption that are then taken into account by the charge calculation function 125.

In another embodiment, the charge calculation function 125 can take into account peak usage periods. For example, the resource provider can define peak usage periods of overall high customer usage of the resource during which consumption may be charged at a higher rate. Accordingly, the meter data 115 is evaluated to identify any consumption during a peak usage period, which is taken into account by the charge calculation function 125.

In another embodiment, the charge calculation function 125 can take into account seasonal consumption. For example, the resource provider can define a first season (e.g., June and July) for which a particular charge rate is to be applied that is different than a charge rate for consumption that is not during the first season. Accordingly, the meter data 115 is evaluated to identify any consumption during the first season, which is taken into account by the charge calculation function 125.

The billing module 105 deducts the charge amount from a credit balance within the prepaid account to create a temporary billing segment 130 indicative of a current balance Of the prepaid account as of the occurrence of the periodic interval that triggered the meter data evaluation. In one embodiment, the deduction is merely performed for the creation of the temporary billing segment 130 without performing an actual debit ledger transaction from the prepaid account, which significantly reduces processing overhead otherwise used by accounting and billing software modules. The temporary billing segment 130 can be stored within a temporary data structure that does not trigger the generation of a bill and does not trigger performance of a ledger transaction.

The billing module 105 evaluates the temporary billing segment 130 to determine whether any actions should be performed. In one embodiment, if the current balance is below a first threshold (e.g., a zero balance), then a shutoff command is sent to the meter 110 to shutoff access to the resource before the billing cycle ends. In another embodiment, if the current balance is below a second threshold (e.g., below $10), then a message is sent to the user of the current balance with an opportunity (e.g., a link to a user interface or website through which the user can add credits) to add credits to the prepaid account.

In one embodiment of performing actions based upon temporary billing segments, a shutoff command is sent over a network from the billing module 105 to the meter 110 based upon the current balance being below the first threshold. Current consumption data is retained within a data structure, such as consumption by the user up until the point of shutoff. An add credit command may be received from the user at some point, such as where the user submits a payment through the user interface or website to bring a balance of the prepaid account above the first threshold. Any trigger may be the add credit command, such as a payment received via a payment processor. Accordingly, the billing module 105 sends a turn on command over the network to the meter 110 to turn on access to the resource based upon the add credit command increasing the credit balance above the first threshold. The billing module 105 will utilize the current consumption data from within the data structure when executing the charge calculation function for a subsequent meter data evaluation. Thus, if the user had consumed an allocated amount of resources at a lower tiered price, then such consumption will still be accounted as opposed to starting the user fresh in the middle of a billing cycle.

Any number of meter data evaluations can be performed during the billing cycle. In one embodiment, in response to a second instance of the periodic interval 120 occurring (e.g., 15 minutes since the prior instance of periodic interval 120 occurring), a second meter data evaluation is performed during the billing cycle. Second meter data is obtained from the meter 110 by the billing module 105. The second meter data is indicative of a second consumption measurement of the resource during a second timespan from when the first bill was generated to when the second instance of the periodic interval occurred (e.g., a prior 30 minutes that overlaps the first 15 minutes of the timespan accounted for by the temporary billing segment 130). The charge calculation function 125 is executed upon the second consumption measurement to generate a second charge amount for the second timespan. The second charge amount is deducted from the credit balance within the prepaid account to create a second temporary billing segment indicative of a second current balance of the prepaid account as of the second instance of the periodic interval. In one embodiment, the temporary billing segment 130 is replaced with the second temporary billing segment, which reduces data storage consumption otherwise used to store all the temporary billing segments 130 during the billing period. In other embodiments, one or more temporary billing segments (e.g., a last 8 temporary billing segments) are retained, such as for providing temporary billing segment history to the user through a user interface.

In response to a final instance of the period interval occurring during the billing cycle (e.g., at the end of the billing cycle) as a trigger for generating the second bill, final meter data is obtained from the meter 110. The final meter data is indicative of a final consumption measurement of the resource during the billing cycle. In this way, the charge calculation function 125 is executed upon the final consumption measurement to generate the second bill (e.g., a final or actual bill) used to perform a ledger transaction. In this way, a full accounting of consumption and charging the prepaid account is performed.

In one embodiment, a user interface is displayed through a computing device to the user. The user interface is populated with user interface elements for monitoring and managing the prepaid account. The user interface is populated with a current credit balance element through which a current credit balance is displayed. The user interface is populated with an add credits element through which the user can pay for more credits. The user interface is populated with a cancel account element through which the user can cancel the prepaid account. The user interface is populated with a temporary billing statement element through which the user can view temporary billing statements. The user interface is populated with a user interface element through which the user can submit a request to change the prepaid account to a post pay account. In response to the request to change to the post pay account, the periodic interval is deleted and the prepaid account is modified to the post pay account.

Figure 2:
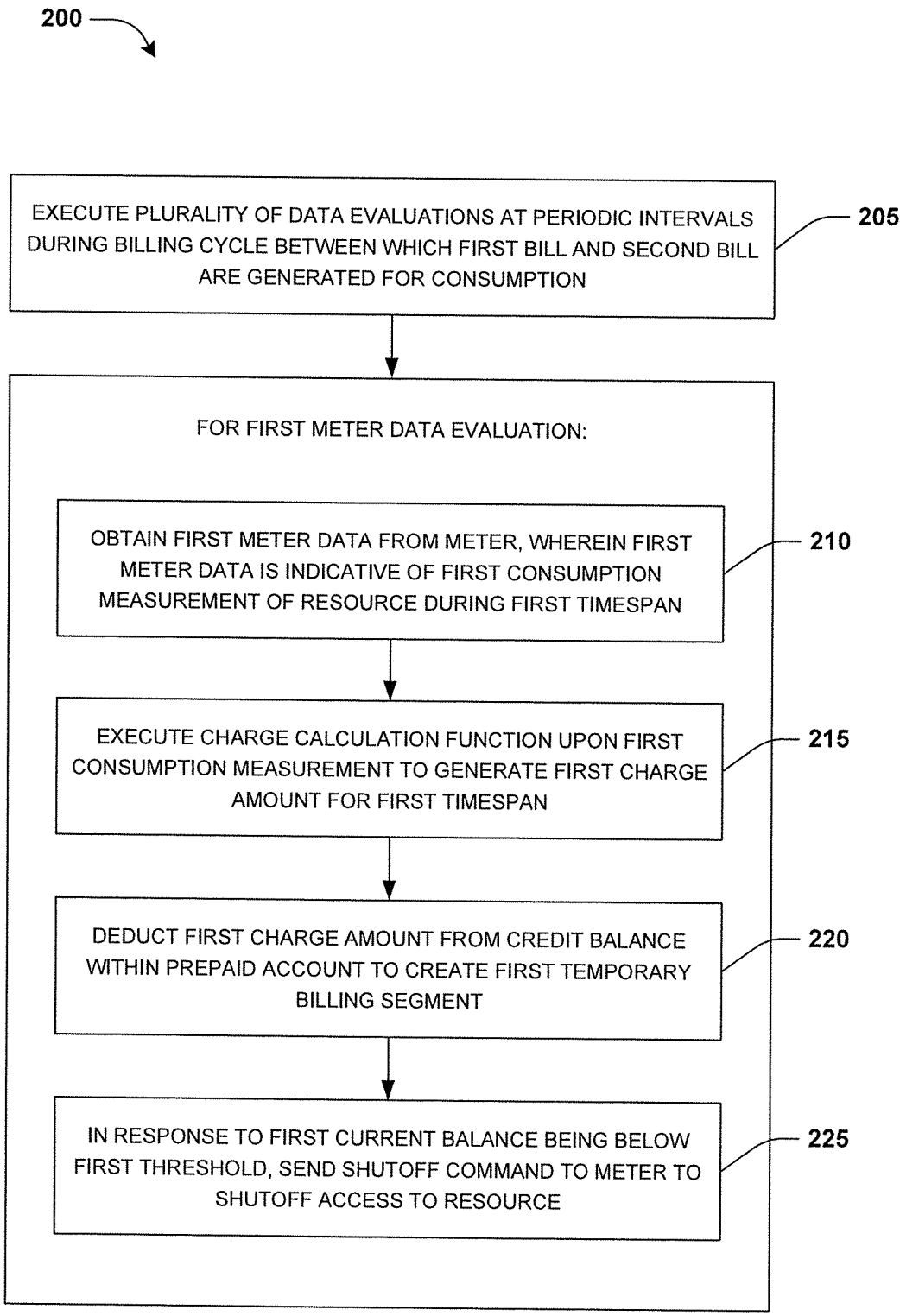
FIG. 2 illustrates an embodiment of a method associated with performing multiple periodic meter data evaluations during a billing cycle.

With reference to FIG. 2, one embodiment of a computer implemented method 200 associated with performing multiple periodic meter data evaluations during a billing cycle is illustrated. In one embodiment, the method 200 is performed by the billing module 105 utilizing various computing resources of the computer 515, such as the processor 520 for executing instructions associated with creating temporary billing segments. Memory 535 and/or disks 555 are used for storing temporary data structures of temporary billing segments and/or other data. Network hardware is used for communicating data structures between the computer 515 and remote computers over a network, such as between the billing module 105, a meter, and/or a resource provider computer. The method 200 is triggered upon a command to perform periodic meter data evaluations for a meter associated with a prepaid account of a user consuming a resource.

Figure 3A:
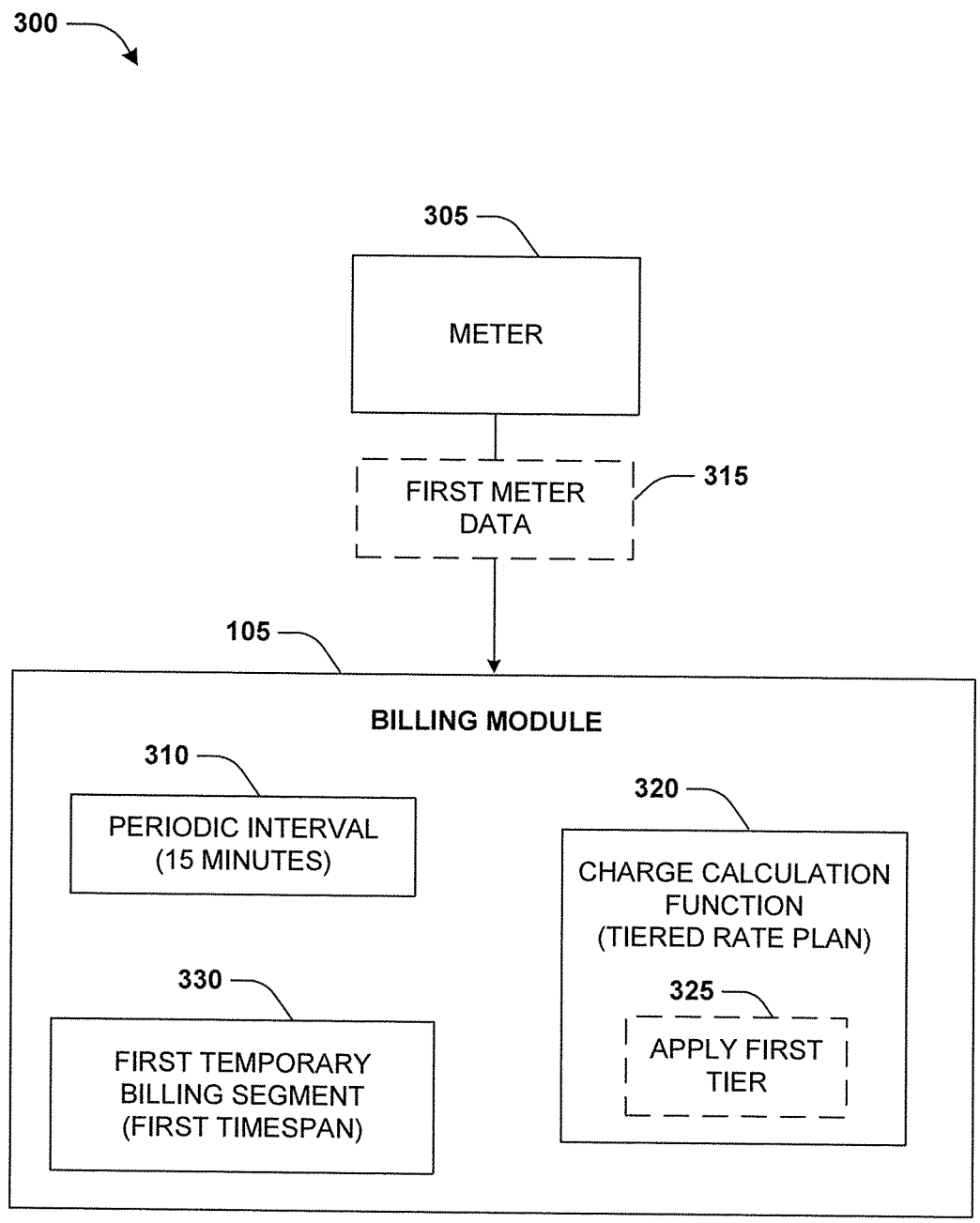
FIG. 3A illustrates an embodiment of a system associated with performing multiple periodic meter data evaluations during a billing cycle, where first meter data is used to generate a first temporary billing segment.

At 205, a plurality of meter data evaluations are executed at periodic intervals 310, such as every 15 minutes, during a billing cycle for consumption of the resource by the user having the prepaid account for the resource, as illustrated by example system 300 of FIG. 3A. The billing cycle can be between when a first bill and a second bill are generated. A first meter data evaluation is triggered based upon a first instance of the periodic interval 310 occurring (e.g., 15 minutes after the first bill was generated). Accordingly, first meter data 315 is obtained from the meter 305 by the billing module 105, at 210. The first meter data 315 is indicative of a first consumption measurement of the resource during a first timespan (e.g., the last 15 minutes) from when the billing cycle started to when the first instance of the periodic interval 310 occurred to trigger the first meter data evaluation.

At 215, a charge calculation function 320 is executed upon the first consumption measurement to generate a first charge amount for the first timespan. In one embodiment, the charge calculation function 320 implements a tiered rate plan where a first charge rate of a first consumption tier is applied for a first 10 kW used during the billing cycle, a second charge rate of a second consumption tier is applied to a next 20 kW used during the billing cycle, and a third charge rate of a third consumption tier is applied to any consumption beyond the first 30 kW. Because the first consumption measurement may indicate that 8 kW was consumed during the first timespan, the charge calculation function 320 applies 325 the first charge rate to the first consumption metric to generate the first charge amount.

At 220, the first charge amount (e.g., $50) is deducted from a credit balance (e.g., a $250 balance) within the prepaid account to create a first temporary billing segment 330 for the first timespan. In one embodiment, the first temporary billing segment 330 is indicative of a first current balance of the prepaid account as of the occurrence of the first instance of the periodic interval 310, such as a $200 remaining balance when taking into account the first charge amount. Because the $200 remaining balance does not fall below a first threshold of $0 and does not fall below a second threshold of $70, no further action is taken. In another embodiment, the first temporary billing segment 330 is indicative of current charges for consumption for the period, such as $50 worth of consumption.

Figure 3B:
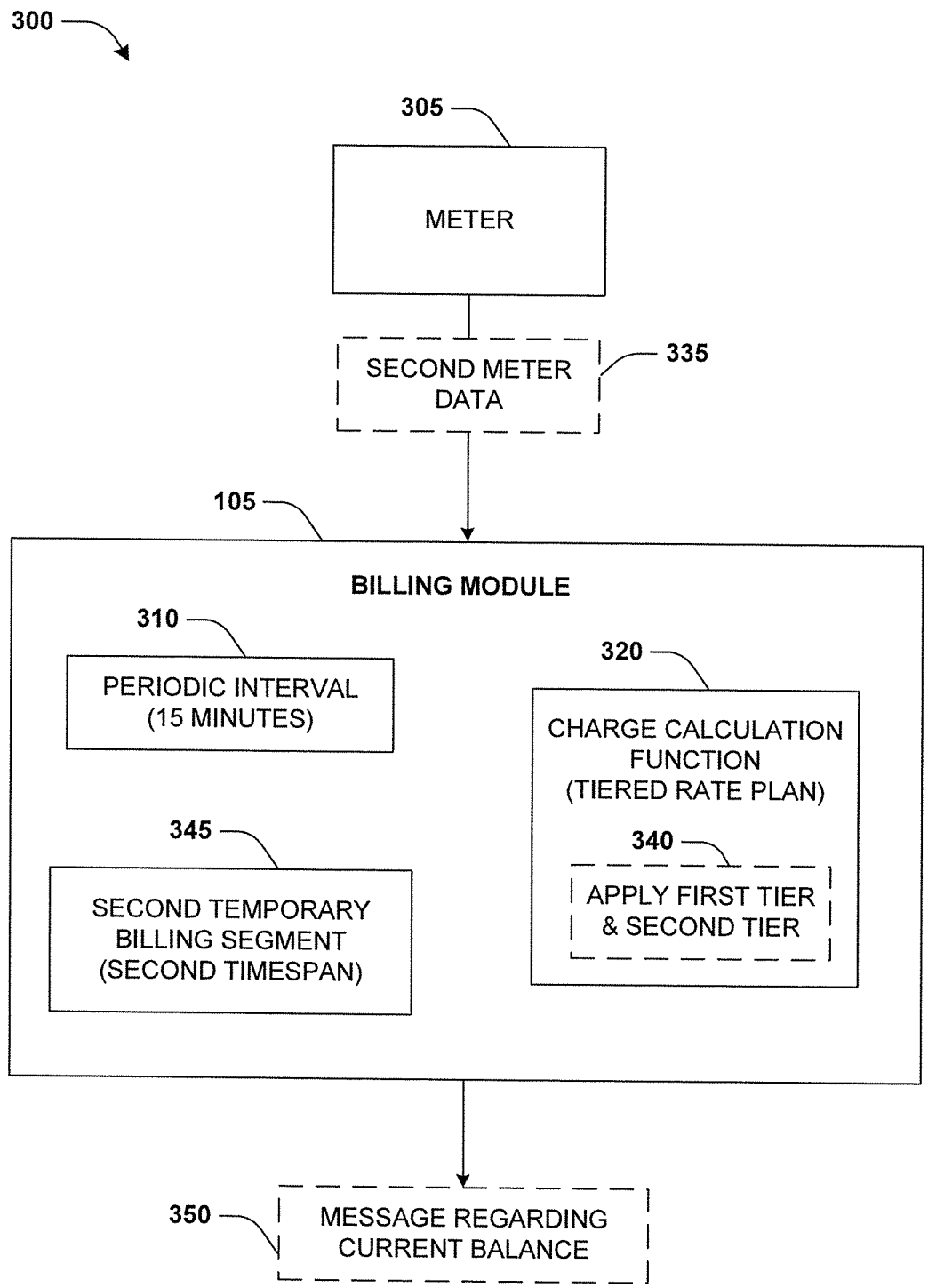
FIG. 3B illustrates an embodiment of a system associated with performing multiple periodic meter data evaluations during a billing cycle, where second meter data is used to generate a second temporary billing segment.

In response to a second instance of the periodic interval 310 occurring, a second meter data evaluation is triggered, as illustrated in FIG. 3B. Second meter data 335 is obtained from the meter 305 by the billing module 105. The second meter data 335 is indicative of a second consumption measurement of the resource during a second timespan (e.g., the last 30 minutes) from when the billing cycle started to when the second instance of the periodic interval 310 occurred to trigger the second meter data evaluation.

The billing module 105 executes the charge calculation function 320 upon the second consumption measurement to generate a second change amount for the second timespan. Because the second consumption measurement may indicate that 20 kw was consumed during the second timespan (e.g., the 8 kW consumed during the first timespan and an additional 12 kW thereafter), the charge calculation function 320 applies 340 the first charge rate to the first 10 kW and the second charge rate to the next 10 kW to generate the second charge amount for the second consumption measurement.

In one embodiment, the second charge amount (e.g., $200) is deducted from the credit balance (e.g., a $250 balance) within the prepaid account to create a second temporary billing segment 345 for the second timespan. In another embodiment, the second temporary billing segment 345 is indicative of charges to date during the billing cycle (e.g., charges for the second timespan). The second temporary billing segment 345 is indicative of a second current balance of the prepaid account as of the occurrence of the second instance of the periodic interval 310, such as a $50 remaining balance when taking into account the second charge amount. Because the $50 remaining balance does not fall below the first threshold of $0 and does fall below the second threshold of $70, a message 350 regarding the $50 remaining balance is sent to the user. The second temporary billing segment 345 is stored in place of the first temporary billing segment 330.

Figure 3C:
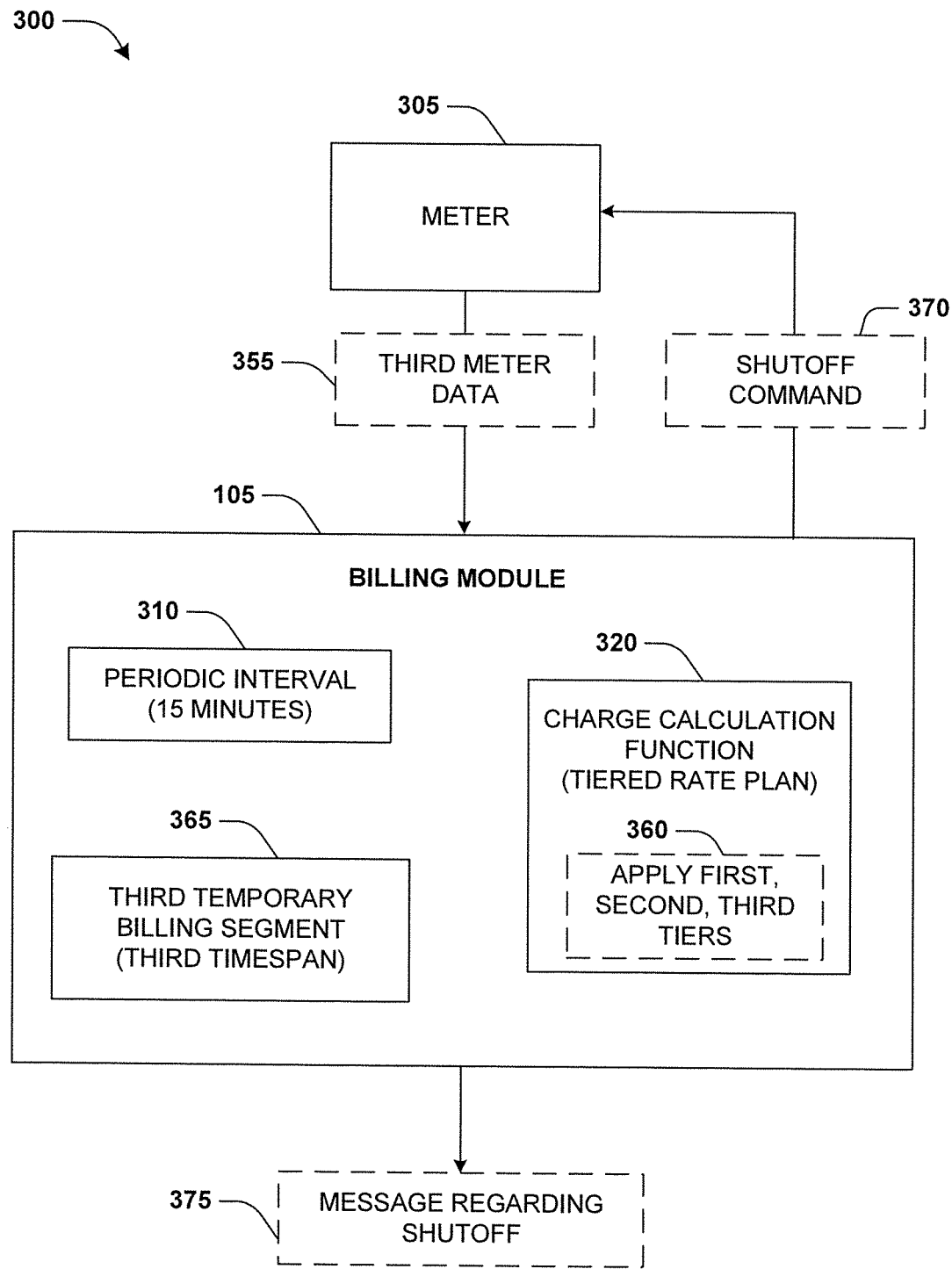
FIG. 3C illustrates an embodiment of a system associated with performing multiple periodic meter data evaluations during a billing cycle, where a shutoff command is sent to a meter.

In response to a third instance of the periodic interval 310 occurring, a third meter data evaluation is triggered, as illustrated in FIG. 3C. Third meter data 355 is obtained from the meter 305 by the billing module 105. The third meter data 355 is indicative of a third consumption measurement of the resource during a third timespan (e.g., the last 45 minutes) from when the billing cycle started to when the third instance of the periodic interval 310 occurred to trigger the third meter data evaluation.

The billing module 105 executes the charge calculation function 320 upon the third consumption measurement to generate a third change amount for the third timespan. Because the third consumption measurement may indicate that 40 kw was consumed during the second timespan (e.g., an additional 20 kW since the second instance of the periodic interval 310 occurring), the charge calculation function 320 applies 360 the first charge rate to the first 10 kW, the second charge rate to the next 20 kW, and the third charge rate to the remaining 10 kW to generate the third charge amount for the third consumption measurement.

The third charge amount (e.g., $250) is deducted from the credit balance (e.g., a $250 balance) within the prepaid account to create a third temporary billing segment 365 for the third timespan. The third temporary billing segment 365 is indicative of a third current balance of the prepaid account as of the occurrence of the third instance of the periodic interval 310, such as a $0 remaining balance when taking into account the third charge amount. Because the $0 remaining balance falls below a first threshold of $0, a shutoff command 370 is sent to the meter 305 to shutoff access to the resource, at 225. A message 375 regarding the shutoff is sent to the user. The third temporary billing segment 365 is stored in place of the second temporary billing segment 345.

Figure 3D:
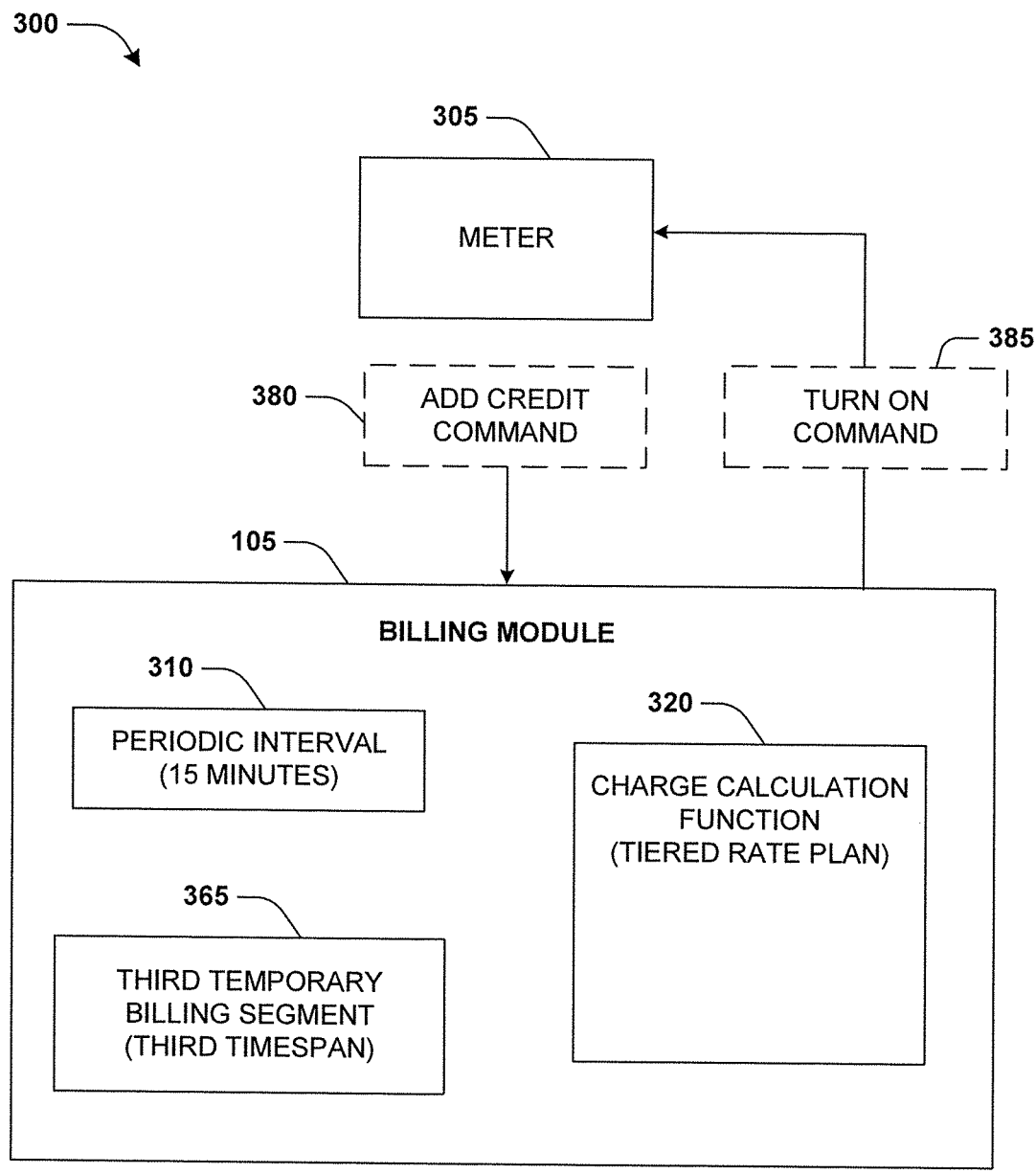
FIG. 3D illustrates an embodiment of a system associated with performing multiple periodic meter data evaluations during a billing cycle, where a turn on command is sent to a meter.

FIG. 3D illustrates the billing module 105 receiving an add credit command 380 to add credits to the prepaid account so that the current balance of the prepaid account is greater than the first threshold of $0. Accordingly, the credits are added to the prepaid account, and the billing module 105 sends a turn on command 385 to the meter 305 to restore access to the resource.

Figure 3E:
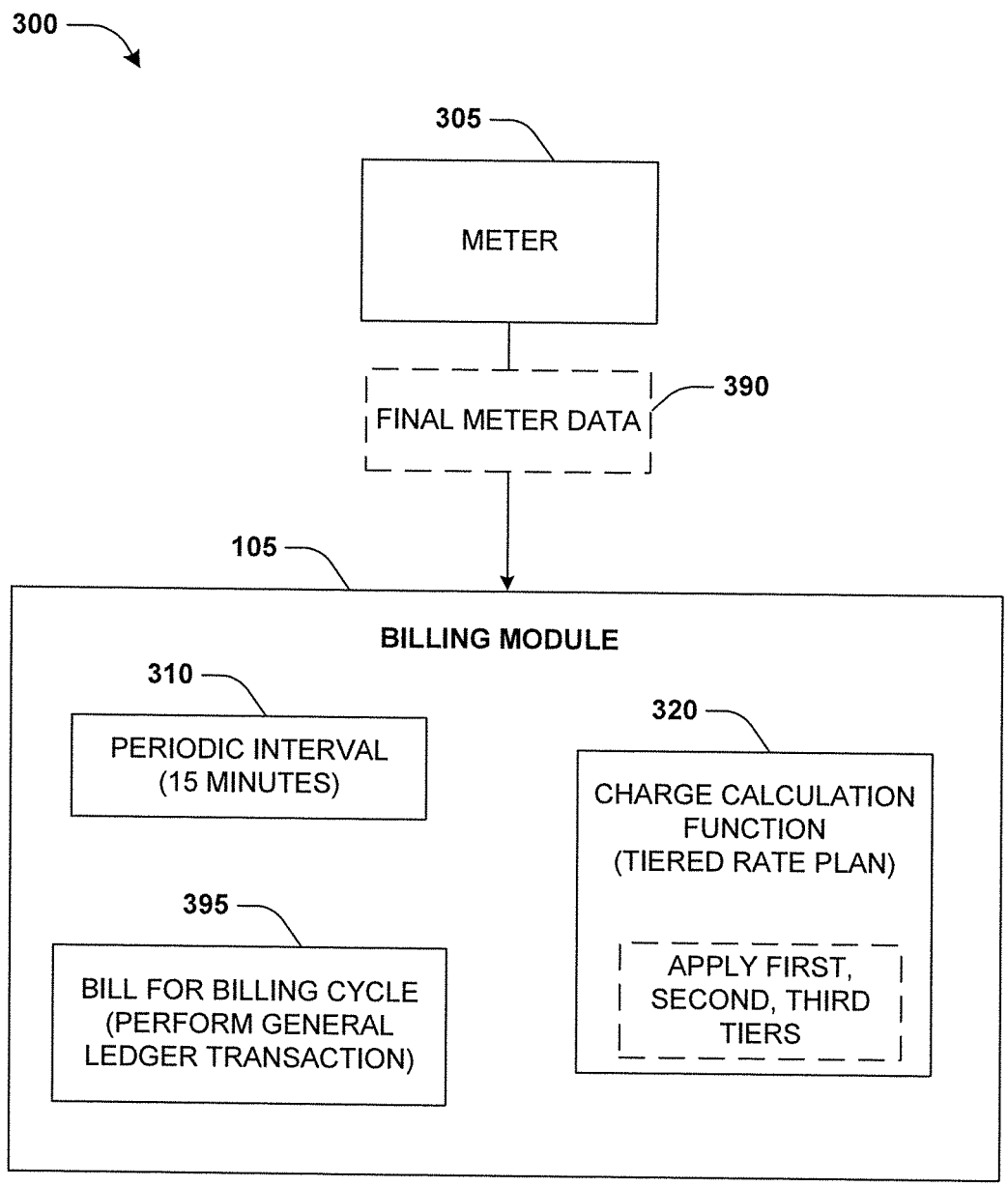
FIG. 3E illustrates an embodiment of a system associated with performing multiple periodic meter data evaluations during a billing cycle, where a bill is generated at an end of the billing cycle.

In response to a final instance of the periodic interval 310 occurring, a bill 395 for the billing cycle is created (e.g., the second bill), as illustrated in FIG. 3E. Final meter data 390 is obtained from the meter 305 by the billing module 105. The final meter data 390 is indicative of a final consumption measurement of the resource during the billing cycle. The billing module 105 executes the charge calculation function 320 upon the final consumption measurement to generate the bill 395. The bill 395 is used to perform a general ledger transaction to debit the credit balance of the prepaid account.

Figure 4:
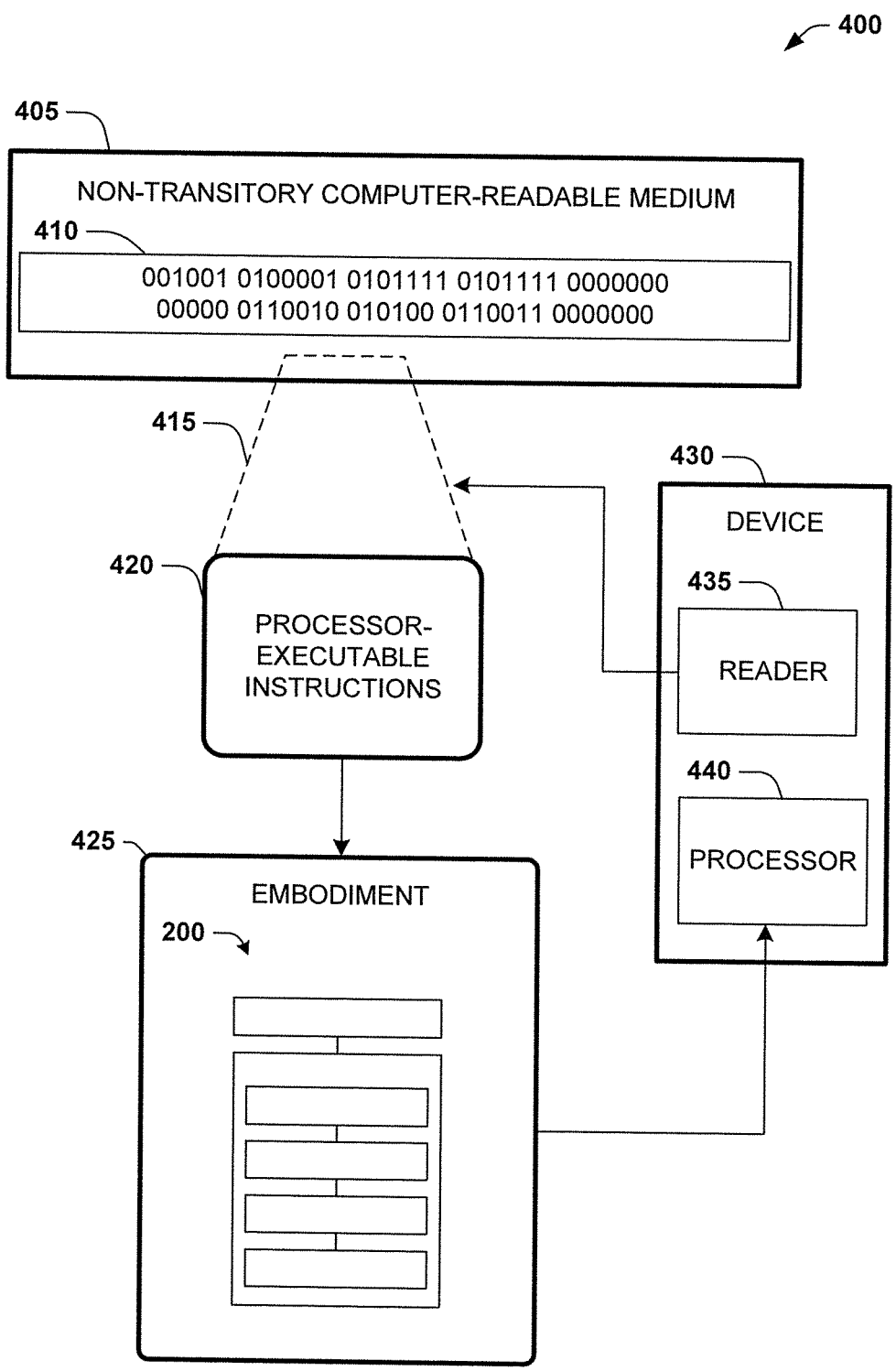
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the billing module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the billing module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
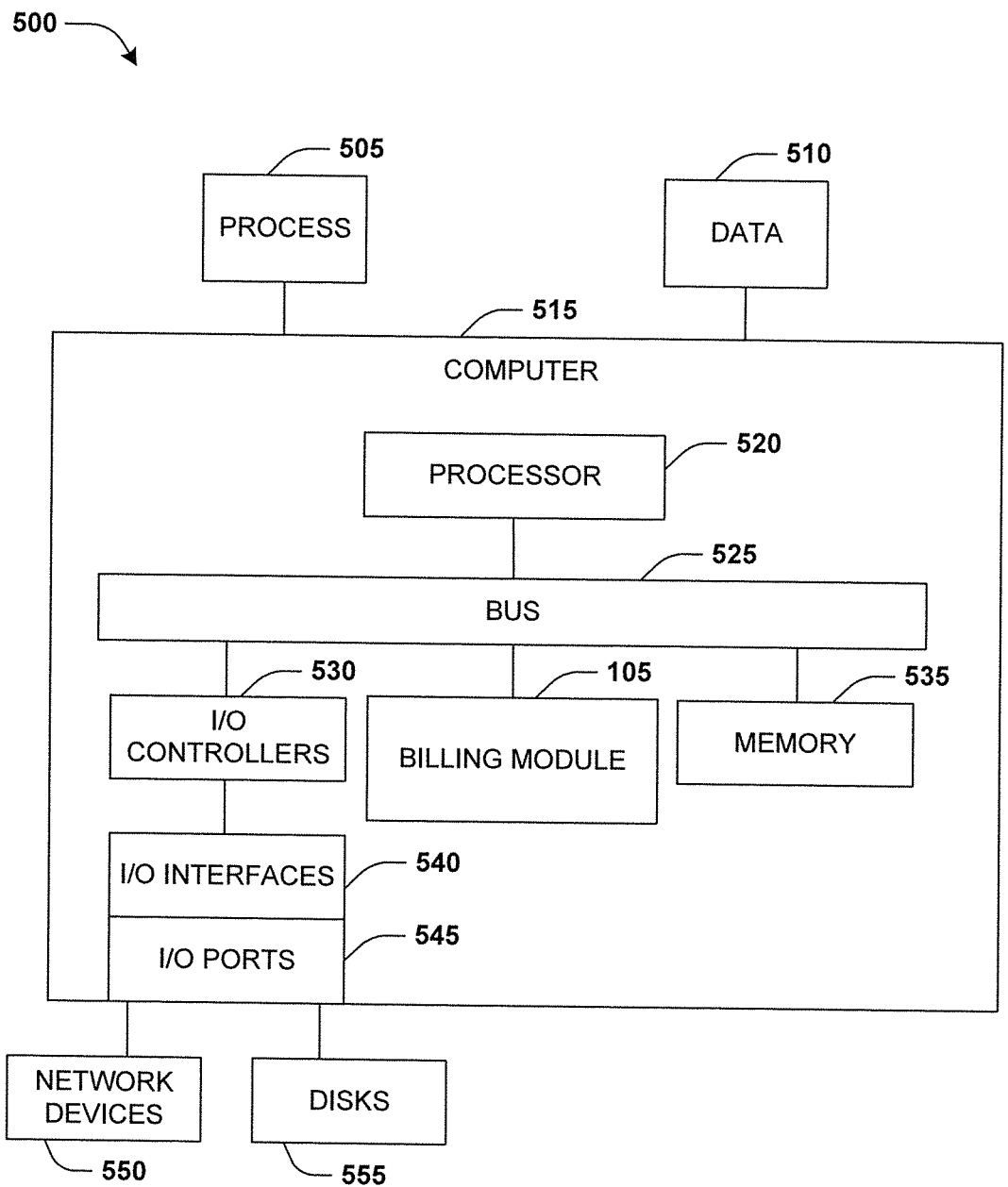
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the, the computer 515 may include logic of the billing module 105 configured to facilitate the system 100 and/or the method 200 shown in FIGS. 1-2. In different embodiments, the logic of the billing module 105 may be implemented in hardware, a non-transitory computer-readable medium 505 with stored instructions, firmware, and/or combinations thereof. While the logic of the billing module 105 is illustrated as a hardware component attached to the bus 525, it is to be appreciated that in other embodiments, the logic of the billing module 105 could be implemented in the processor 520, stored in memory 535, or stored in disk 555.

In one embodiment, logic of the billing module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the billing module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
execute a plurality of meter data evaluations at periodic intervals during a billing cycle for consumption of a resource by a resource user having a prepaid account for the resource, wherein a first meter data evaluation comprises:
obtaining first meter data from a meter associated with the prepaid account, wherein the first meter data is indicative of a first consumption measurement of the resource during a first timespan from a start of the billing cycle to when a first instance of the periodic interval occurred to trigger the first meter data evaluation;
executing a charge calculation function upon the first consumption measurement to generate a first charge amount for the first timespan by utilizing the first consumption measurement from within a temporary data structure when executing the charge calculation function;
deducting the first charge amount from a credit balance within the prepaid account to create a first temporary billing segment indicative of first consumption charges as of the first instance of the periodic interval;
storing the first temporary billing segment, as a bill amount calculation, within the temporary data structure that does not trigger generation of a bill and does not trigger performance of a ledger transaction, wherein the first temporary billing segment may be retained for a threshold amount of time until a next (N) temporary billing segment is created;
in response to the first current balance being below a first threshold, sending a shutoff command to the meter to shutoff access to the resource before the billing cycle ends;
in response to sending a shutoff command to the meter, shutting off the resource by the meter before the billing cycle ends;
receiving a resource user request, via a user interface, to change the prepaid account to a post pay account;
in response to receiving the user request to change the prepaid account to a post pay account, deleting the periodic intervals;
in response to deleting the periodic intervals, modifying the prepaid account to the post pay account;
displaying the user interface through a computing device to the resource user; and
populating the user interface with:
(i) an add credits element through which the resource user can pay for more credits; and
(ii) a temporary billing statement element through which the resource user can view temporary billing statements.

2. The non-transitory computer-readable medium of claim 1, wherein the computer-executable instructions comprise computer-executable instructions to cause the processor to:
perform a second meter data evaluation during the billing cycle in response to a second instance of the periodic interval occurring, wherein the second meter data evaluation comprises:
obtaining second meter data from the meter, wherein the second meter data is indicative of a second consumption measurement of the resource;
executing the charge calculation function upon the second consumption measurement to generate a second charge amount for a second timespan from the start of the billing cycle to when the second instance of the periodic interval occurred;
deducting the second charge amount from the credit balance within the prepaid account to create a second temporary billing segment indicative of second consumption charges as of the second instance of the periodic interval; and
replacing the first temporary billing segment with the second temporary billing segment.

3. The non-transitory computer-readable medium of claim 1, wherein the computer-executable instructions comprise computer-executable instructions to cause the processor to:
in response to a final instance of the periodic interval occurring during the billing cycle as a trigger for generating a bill:
obtain final meter data from the meter, wherein the final meter data is indicative of a final consumption measurement of the resource during the billing cycle; and
execute the charge calculation function upon the final consumption measurement to generate the bill used to perform a ledger transaction.

4. The non-transitory computer-readable medium of claim 1, wherein the computer-executable instructions comprise computer-executable instructions to cause the processor to:
in response to the first current balance being below a second threshold, send a message, via the user interface, to the user of the first current balance.

5. The non-transitory computer-readable medium of claim 1, wherein the computer-executable instructions comprise computer-executable instructions to cause the processor to:
display the user interface through a computing device to the user; and
populate the user interface with:
(i) a current credit balance element through which the credit balance is displayed; and
(ii) a cancel account element through which the user can cancel the prepaid account.

6. A computing system, comprising:
a processor connected to memory; and
a billing module stored on a non-transitory computer readable medium and configured with instructions that when executed by the processor cause the processor to:
execute a plurality of meter data evaluations at periodic intervals during a billing cycle for consumption of a resource by a resource user having a prepaid account for the resource, wherein a first meter data evaluation comprises:
obtaining first meter data from a meter associated with the prepaid account, wherein the first meter data is indicative of a first consumption measurement of the resource during a first timespan from a start of the billing cycle to when a first instance of the periodic interval occurred to trigger the first meter data evaluation;
executing a charge calculation function upon the first consumption measurement to generate a first charge amount for the first timespan by utilizing the first consumption measurement from within a temporary data structure when executing the charge calculation function;
deducting the first charge amount from a credit balance within the prepaid account to create a first temporary billing segment indicative of first consumption charges as of the first instance of the periodic interval;

storing the first temporary billing segment within the temporary data structure that does not trigger generation of a bill and does not trigger performance of a ledger transaction, wherein the first temporary billing segment may be retained for a threshold amount of time until a next (N) temporary billing segment is created;

in response to the first current balance being below a first threshold, sending a shutoff command to the meter to shutoff access to the resource before the billing cycle ends;

in response to sending a shutoff command to the meter, shutting off the resource by the meter before the billing cycle ends;

receiving a resource user request, via a user interface, to change the prepaid account to a post pay account;

in response to receiving the user request to change the prepaid account to a post pay account, deleting the periodic intervals;

in response to deleting the periodic intervals, modifying the prepaid account to the post pay account;

displaying the user interface through a computing device to the resource user; and populating the user interface with:
(i) an add credits element through which the resource user can pay for more credits; and
(ii) a temporary billing statement element through which the resource user can view temporary billing statements.

7. The computing system of claim 6, wherein the instructions that execute the charge calculation function comprise instructions that cause the processor to:
execute the charge calculation function to apply a first charge rate of a tiered rate plan to a first portion of the first consumption measurement and a second charge rate of the tiered rate plan to a second portion of the first consumption measurement.

8. The computing system of claim 6, wherein the instructions that execute the charge calculation function comprise instructions that cause the processor to:
determine a discount associated with the user; and
execute the charge calculation function to account for the discount when generating the first charge amount.

9. The computing system of claim 8, wherein the instructions cause the processor to:
evaluate user data of the user to determine an age of the user; and
determine the discount based upon the age.

10. The computing system of claim 8, wherein the instructions cause the processor to:
evaluate user data of the user to determine a user characteristic of the user; and
determine the discount based upon the user characteristic.

11. The computing system of claim 6, wherein the instructions that execute the charge calculation function comprise instructions that cause the processor to:
execute the charge calculation function to account for a fixed charge when generating the first charge amount.

12. The computing system of claim 6, wherein the instructions that execute the charge calculation function comprise instructions that cause the processor to:
determine that the first meter data is indicative of a surge of consumption exceeding a threshold; and
execute the charge calculation function to account for the surge of consumption when generating the first charge amount.

13. The computing system of claim 6, wherein the instructions cause the processor to:
in response to the first current balance being below a second threshold, send a message via the user interface to the user of the first current balance.

14. A computer-implemented method, the computer-implemented method involving a computing device comprising a processor, and the computer-implemented method comprising:
executing, by the processor, a plurality of meter data evaluations at periodic intervals during a billing cycle for consumption of a resource by a resource user having a prepaid account for the resource, wherein a first meter data evaluation comprises:
obtaining, by the processor, first meter data from a meter associated with the prepaid account, wherein the first meter data is indicative of a first consumption measurement of the resource during a first timespan from when a start of the billing cycle to when a first instance of the periodic interval occurred to trigger the first meter data evaluation;
executing, by the processor, a charge calculation function upon the first consumption measurement to generate a first charge amount for the first timespan by utilizing the first consumption measurement from within a temporary data structure when executing the charge calculation function;
deducting, by the processor, the first charge amount from a credit balance within the prepaid account to create a first temporary billing segment indicative of a first current balance of the prepaid account as of the first instance of the periodic interval;
storing the first temporary billing segment within the temporary data structure that does not trigger generation of a bill and does not trigger performance of a ledger transaction, wherein the first temporary billing segment may be retained for a threshold amount of time until a next (N) temporary billing segment is created;
in response to the first current balance being below a first threshold, sending, by the processor, a shutoff command to the meter to shutoff access to the resource before the billing cycle ends;
in response to sending a shutoff command to the meter, shutting off the resource by the meter before the billing cycle ends;
receive a resource user request, via a user interface, to change the prepaid account to a post pay account;
in response to receiving the user request to change the prepaid account to a post pay account, delete the periodic intervals;
in response to deleting the periodic intervals, modify the prepaid account to the post pay account;
displaying the user interface through a computing device to the resource user; and
populating the user interface with:
(i) an add credits element through which the resource user can pay for more credits; and
(iv) a temporary billing statement element through which the resource user can view temporary billing statements.

15. The computer-implemented method of claim 14, further comprising:

determining, by the processor, that the first meter data is indicative of consumption during a peak usage period; and executing, by the processor, the charge calculation function to account for the consumption during the peak usage period when generating the first charge amount.

16. The computer-implemented method of claim 14, further comprising:

determining, by the processor, that the first meter data is indicative of consumption during a first season; and executing, by the processor, the charge calculation function to account for the consumption during the season when generating the first charge amount.

17. The computer-implemented method of claim 14, further comprising:

sending, by the processor, the shutoff command over a network to the meter;

saving, by the processor, current consumption data of the first timespan within a data structure;

receiving, by the processor, via the user interface, an add credit command from the user;

sending, by the processor, a turn on command over the network to the meter to turn on access to the resource based upon the add credit command increasing the credit balance above the first threshold; and utilizing, by the processor, the current consumption data within the data structure when executing the charge calculation function during a subsequent meter data evaluation.

* * * * *